United States Patent
Ohannessian et al.

(10) Patent No.: US 9,361,105 B2
(45) Date of Patent: Jun. 7, 2016

(54) TECHNIQUE FOR COUNTING VALUES IN A REGISTER

(71) Applicant: NVIDIA CORPORATION, Santa Clara, CA (US)

(72) Inventors: Robert Ohannessian, Austin, TX (US); Brian Fahs, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 73 days.

(21) Appl. No.: 14/033,385

(22) Filed: Sep. 20, 2013

(65) Prior Publication Data

US 2015/0089207 A1     Mar. 26, 2015

(51) Int. Cl.
*G06F 7/00*     (2006.01)
*G06F 9/30*     (2006.01)

(52) U.S. Cl.
CPC ................................. *G06F 9/30105* (2013.01)

(58) Field of Classification Search
CPC .................................................. G06F 9/30105
USPC ........................................................ 708/210
See application file for complete search history.

(56) References Cited

U.S. PATENT DOCUMENTS

| | | | | |
|---|---|---|---|---|
| 5,541,865 A | * | 7/1996 | Ashkenazi | 708/210 |
| 5,717,616 A | * | 2/1998 | Morris | 708/210 |
| 6,073,159 A | * | 6/2000 | Emer et al. | 718/103 |

* cited by examiner

*Primary Examiner* — Tan V. Mai
(74) *Attorney, Agent, or Firm* — Artegis Law Group, LLP (57) ABSTRACT

A parallel counter accesses data generated by an application and stored within a register. The register includes different segments that include different portions of the application data. The parallel counter is configured to count the number of values within each segment that have a particular characteristic in a parallel fashion. The parallel counter may then return the individual segment counts to the application, or combine those segment counts and return a register count to the application. Advantageously, applications that rely on population count operations may be accelerated. Further, increasing the number of segments in a given register may reduce the time needed to count the values in that register, thereby providing a scalable solution to population counting. Additionally, the architecture of the parallel counter is sufficiently flexible to allow both register counting and segment counting, thereby combining two separate functionalities into just one hardware unit.

20 Claims, 5 Drawing Sheets

TECHNIQUE FOR COUNTING VALUES IN A REGISTER

BACKGROUND OF THE INVENTION

1. Field of the Invention

Embodiments of the present invention relate generally to parallel processing and, more specifically, to a technique for counting values in a register.

2. Description of the Related Art

Conventional computer systems oftentimes have to count the number of bits within a register that are set to one. Such an operation is known in the art as a "population count" operation. A fixed-function unit typically performs a population count operation as part of a larger computation. For example, a Hamming distance computation could rely on a fixed-function unit to perform population count operations. The speed of such computations is limited by the speed with which the population count operation can be performed. Conventional population count operations are suitable for small populations, but do not scale well to larger populations.

Accordingly, what is needed in the art is an improved technique for counting larger populations of elements.

SUMMARY OF THE INVENTION

One embodiment of the present invention sets forth a computer-implemented method for counting values in a register, including receiving a first data set from an application, storing a first portion of the first data set in a first segment of a register, storing a second portion of the first data set in a second segment of the register, determining a first number of values within the first segment that have an identifiable characteristic substantially in parallel with determining a second number of values within the second segment that have the identifiable characteristic, and returning the first number of values and the second number of values to the application.

One advantage of the disclosed technique is that applications that rely on population count operations may be accelerated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
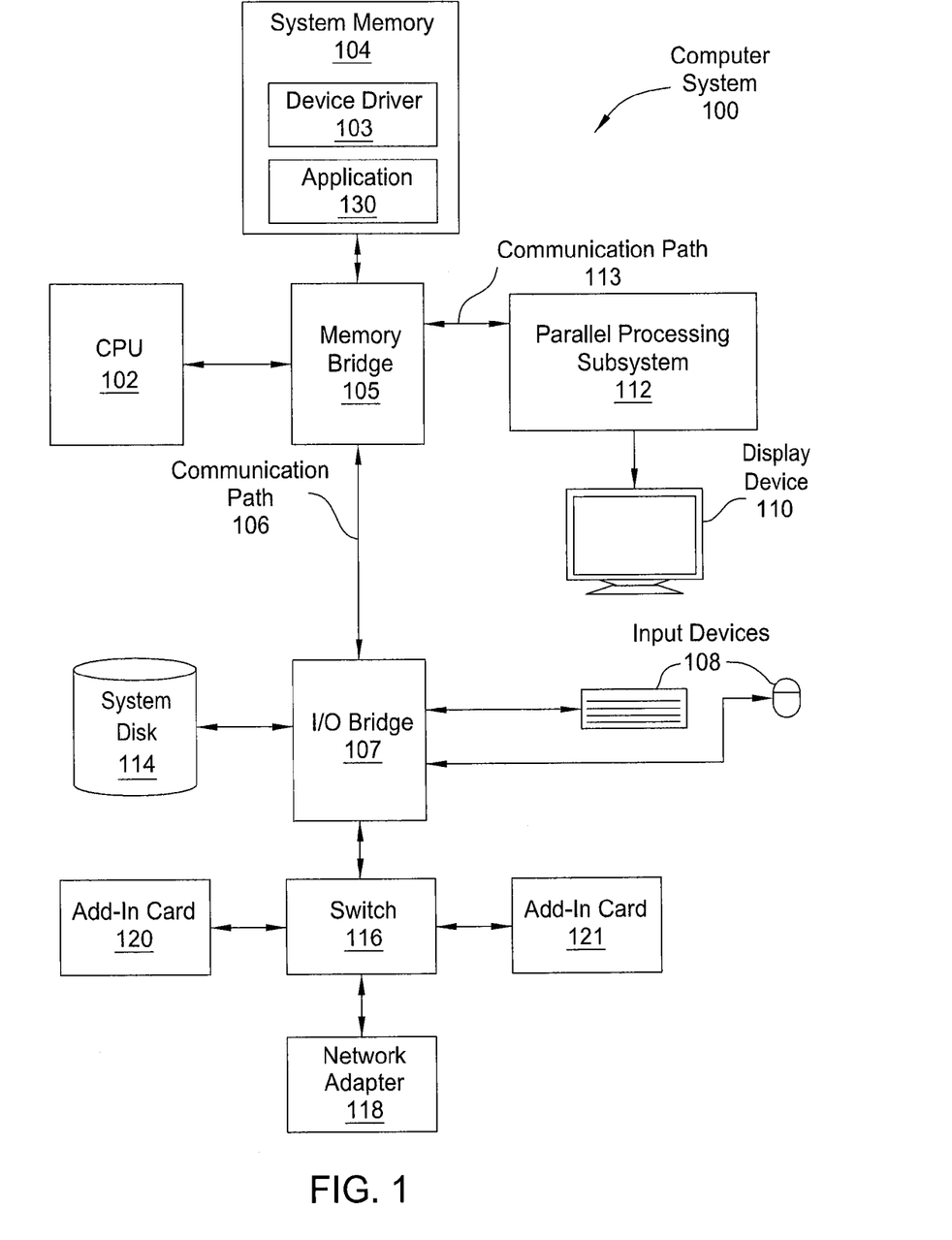
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. System memory 104 also includes an application 130 configured to execute, at least in part, on a parallel processing unit within parallel processing subsystem 112 in a multithreaded fashion.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
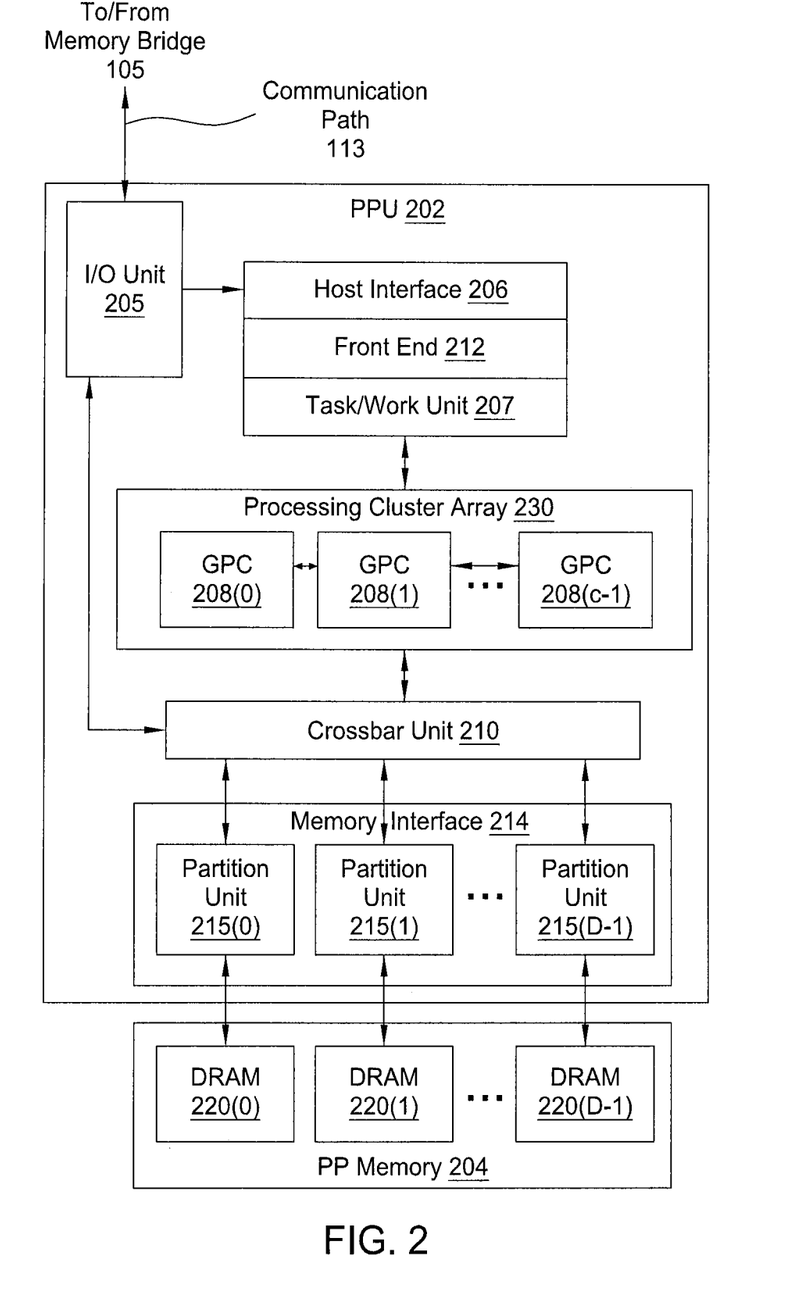
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
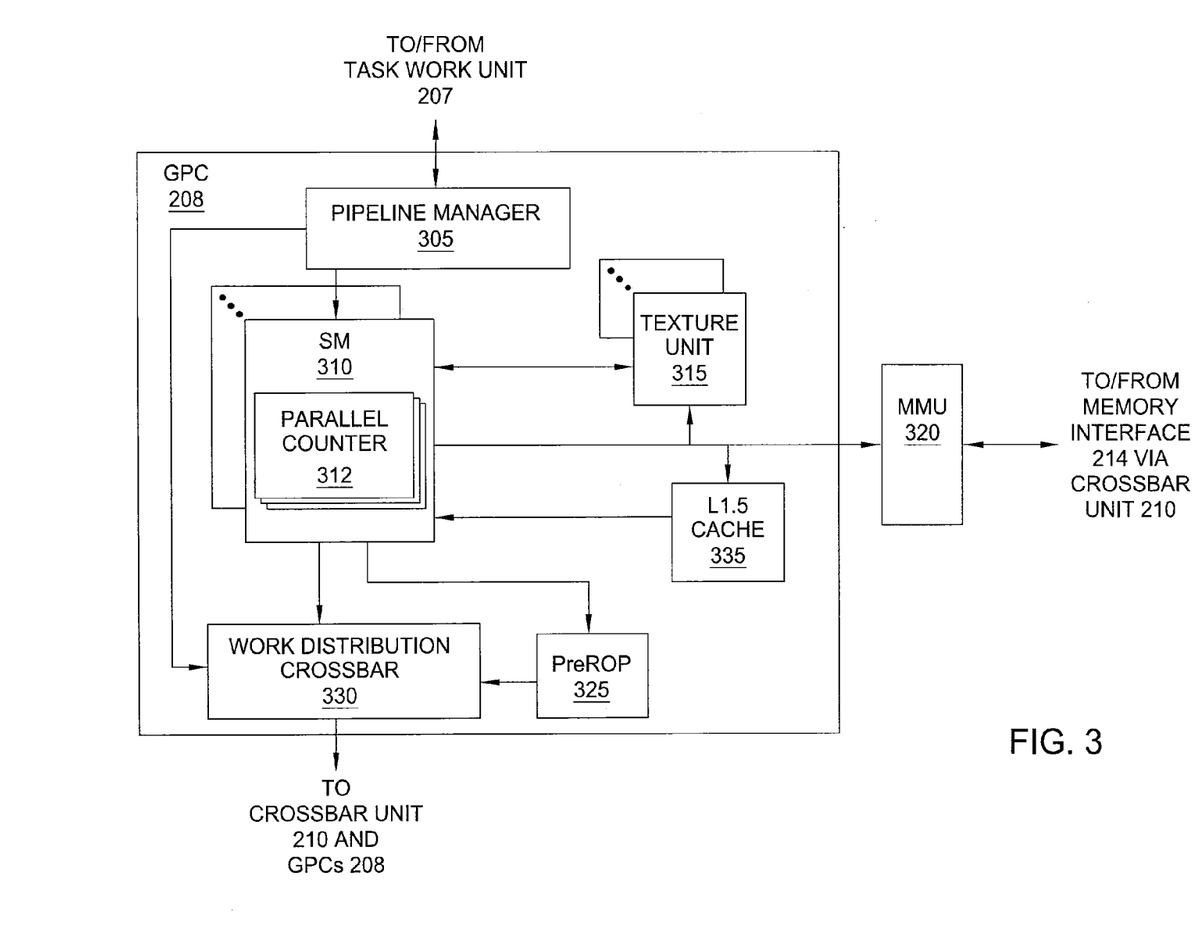
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

Each SM 310 also includes one or more instances of a parallel counter 312, as is shown. A given parallel counter 312 is configured to determine the number of elements within a register. In practice, a given register stores a sequence of ones and zeros, and the associated parallel counter 312 is configured to determine the number of ones within the register. As a general matter, though, a parallel counter 312 may be configured to determine the number of individual elements or groups of elements within a register based on those elements having any identifiable characteristic.

For example, parallel counter 312 could identify and count the number of zeros within the register, or identify and count the number of even-valued bytes within the register. Application 130 shown in FIG. 1 is configured to populate the register within each different parallel counter 312, and to configure each such counter to perform different types of counting. Application 130 is also configured to read the results of that counting from each such parallel counter 312. An exemplary parallel counter 312 is described in greater detail below in conjunction with FIG. 4, and a counting technique that is implemented by parallel counter 312 is described in greater detail below in conjunction with FIG. 5.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

COUNTING VALUES IN A REGISTER

As mentioned above, each SM 310 includes one or more instances of parallel counter 312. A given parallel counter 312 is configured to receive register data from application 130 shown in FIG. 1 and to perform a counting operation specified by application 130 with the received data. The parallel counter 312 then counts the number of values within the register data according to the specified counting operation, and then returns the result of that operation to application 130. In doing so, parallel counter 312 counts portions of the register data in parallel with one another in order to expedite the counting of that data, as described in greater detail below in conjunction with FIG. 4.

Figure 4:
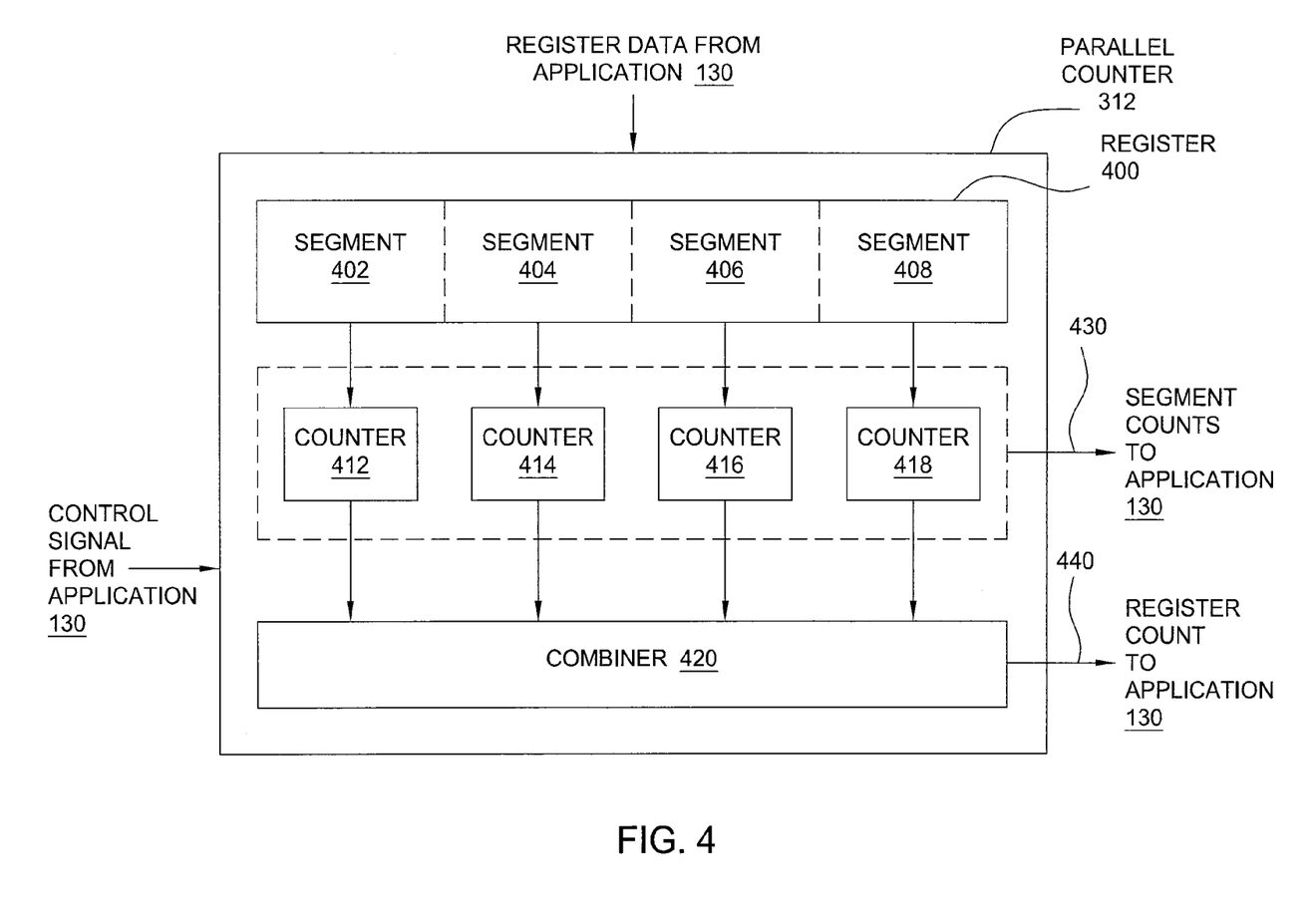
FIG. 4 is a block diagram of a parallel counter that is configured to count values in a register in a parallel fashion, according to one embodiment of the present invention.

FIG. 4 is a block diagram of parallel counter 312 of FIG. 3 that is configured to count values in a register 400 in a parallel fashion, according to one embodiment of the present invention. As shown, parallel counter 312 includes register 400 that is divided into segments 402, 404, 406, and 408. The segments within register 400 are configured to store different portions of register data received from application 130 of FIG. 1. In one embodiment, register 400 may reside outside of parallel counter 312.

Parallel counter 312 includes counters 412, 414, 416, and 418 that are coupled to segments 402, 404, 406, and 418. Counter 412 is configured to count the values within segment 402, counter 414 is configured to count the values within segment 404, counter 416 is configured to count the values within segment 406, and counter 418 is configured to count the values within segment 418. The various counters are configured to count the values within corresponding segments of register 400 in parallel with one another. In practice, each counter is configured to determine the number of values within a corresponding segment of register 400 that are equal to one. As general matter, though, the various counters shown in FIG. 4 may be configured to identify and count register values or groups of register values within the segments of register 400 that have any identifiable characteristic.

Parallel counter 312 is configured to receive a control signal from application 130 that indicates a particular type of counting operation to be performed and a corresponding type of data to be returned to that application 130. When the control signal indicates that a segment count operation should be performed, parallel counter 312 returns the segment counts generated by counters 412, 414, 416, and 418 to application 130 along data pathway 430.

The control signal may, alternatively, indicate that a register count operation should be performed. When the control signal indicates that a register count operation should be performed, a combiner 420 combines the segment counts generated by counters 412, 414, 416, and 418 and then returns the combined value to application 130 along data pathway 440. The combined value generally indicates the total number of values within register 400 as a whole that are equal to one. However, similar to the segment counts, the register count may indicate the total number of register values or groups of register values within register 400 that have any identifiable characteristic.

Persons skilled in the art will recognize that parallel counter 312 may include any number of different segments and corresponding counters, and that the number of such elements shown in FIG. 4 is exemplary in nature and not meant to limit the scope of the present invention in any way.

By implementing one or more parallel counter 312, each SM 310 within PPU 202 may quickly determine the population count of a register. Any functionality of application 130 that depends on the speed with which population counts are performed may thus be accelerated. In addition, the population count functionality described herein scales with the number of segments per register. Thus, increasing the number of segments in a given register may increase the speed with which the corresponding parallel counter performs a population count across that register.

Figure 5:
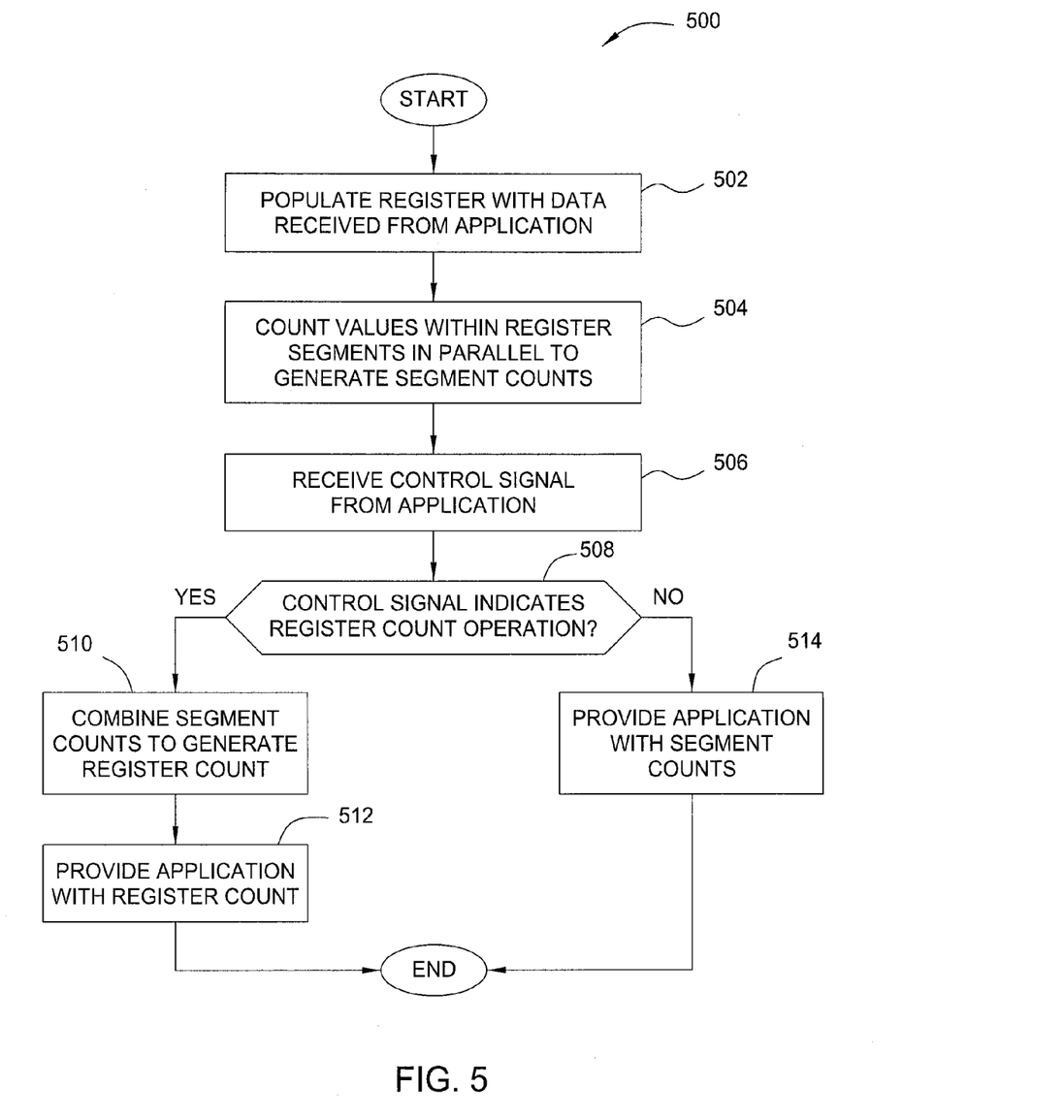
FIG. 5 is a flow diagram of method steps for counting values in a register in a parallel fashion, according to one embodiment of the present invention.

FIG. 5 is a flow diagram of method steps for counting the elements in a set of elements, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where parallel counter 312 populates a register with data received from application 130. The register could be, e.g. register 400 shown in FIG. 4. The data received from application 130 typically includes a sequence of ones and zeros. Different segments of the register are configured to store different portions of the received data. For example, the data could include 32 bytes of data, and four different register segments could each store 8 bytes. Persons skilled in the art will understand that parallel counter 312 may include a register having any feasible size that may be divided into any number of different segments.

At step 504, parallel counter 312 counts the values within the register segments in parallel to generate a set of segment counts. As a general matter, parallel counter 312 includes a number of counters that is equal to the number of segments of the register. Each such counter is configured to count the number of values within a corresponding segment in parallel with the other counters counting the other segments. Each counter also typically counts the number of values in a corresponding segment that equal one, although, as mentioned, other values may also be counted.

At step 506, parallel counter 312 receives a control signal from application 130. The control signal indicates different possible counting operations that parallel counter 312 may perform. At step 508, parallel counter 312 determines whether the control signal indicates a register count operation or a segment count operation. If parallel counter 312 determines that the control signal indicates the register count operation, then parallel counter 312 combines the segment counts to generates a register count. In practice, the register count reflects the total number of register values in the register that equal one. At step 512, parallel counter 312 provides the register count to application 130. The method 500 then ends.

At step 508, if parallel counter 312 determines that the control signal does not indicate the register count operation, thereby indicating the segment count operation, then parallel counter 312 provides application 130 with the individual segment counts generated at step 504. The method 500 then ends.

By implementing the approach described above, parallel counter 312 may expeditiously determine the number of values within a register that have a particular characteristic, such as, e.g., being equal to one. Such functionality accelerates a wide variety of different operations, thereby increasing the overall throughput of the PPU 202 as well as increasing the flexibility with which application 130 may operate. In particular, because application 130 can rely on parallel counter 312 to quickly implement the different counting operations discussed above, application 130 may perform computational operations faster than other approaches.

In sum, a parallel counter accesses data generated by an application and stored within a register. The register includes different segments that include different portions of the application data. The parallel counter is configured to count the number of values within each segment that have a particular characteristic in a parallel fashion. The parallel counter may then return the individual segment counts to the application, or combine those segment counts and return a register count to the application.

One advantage of the disclosed technique is that applications that rely on population count operations may be accelerated. Another advantage is that increasing the number of segments in a given register may reduce the time needed to count the values in that register, thereby providing a scalable solution to population counting. Additionally, the architecture of the parallel counter described herein is sufficiently flexible to allow both register counting and segment counting, thereby combining two separate functionalities into just one hardware unit.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for counting values in a register, the method comprising:
    storing a first portion of a first data set in a first register;
    storing a second portion of the first data set in a second register;
    determining a first number of values within the first register that have an identifiable characteristic; and
    determining a second number of values within the second register that have the identifiable characteristic.

2. The computer implemented method of claim 1, further comprising receiving a first control signal from an application program that indicates that individual register counts should be returned to the application program.

3. The computer-implemented method of claim 2, wherein a thread associated with the application program is configured to:
- generate the first data set;
- transmit the first data set to a parallel counter;
- transmit the first control signal to the parallel counter; and
- receive the first number of values and the second number of values from the parallel counter.

4. The computer implemented method of claim 1, further comprising:
- combining the first number of values with the second number of values; and
- returning the first number of values and the second number of values to an application program as a combined result.

5. The computer implemented method of claim 4, further comprising receiving a second control signal from the application program that indicates that a register count should be returned to the application program.

6. The computer-implemented method of claim 1, wherein the identifiable characteristic comprises equivalence to one.

7. The computer-implemented method of claim 1, wherein the identifiable characteristic comprises equivalence to zero.

8. The computer-implemented method of claim 1, where the application program comprises a multithreaded application program that executes, at least in part, on a parallel processing unit or a single-threaded application program that executes on a serial processing unit.

9. A system, comprising:
- a memory; and
- at least one processor core that includes a parallel counter that is configured to:
  - receive a first data set from an application;
  - store a first portion of the first data set in a first segment of a register;
  - store a second portion of the first data set in a second segment of the register;
  - determine a first number of values within the first segment that have an identifiable characteristic,
  - determine a second number of values within the second segment that have the identifiable characteristic; and
  - return the first number of values and the second number of values to the application.

10. The subsystem of claim 9, wherein the parallel counter is further configured to receive a first control signal from the application that indicates that individual segment counts should be returned to the application.

11. The subsystem of claim 10, wherein a thread associated with the application is configured to:
- generate the first data set;
- transmit the first data set to the parallel counter;
- transmit the first control signal to the parallel counter; and
- receive the first number of values and the second number of values from the parallel counter.

12. The subsystem of claim 9, wherein the parallel counter is further configured to:
- combine the first number of values with the second number of values; and
- return the first number of values and the second number of values to the application as a combined result.

13. The subsystem of claim 12, wherein the parallel counter is further configured to receive a second control signal from the application that indicates that a register count should be returned to the application.

14. The subsystem of claim 9, wherein the identifiable characteristic comprises equivalence to one.

15. The subsystem of claim 9, wherein the identifiable characteristic comprises equivalence to zero.

16. The subsystem of claim 9, where the application comprises a multithreaded application that executes, at least in part, on a parallel processing unit or a single-threaded application that executes on a serial processing unit.

17. A computing device, comprising:
- a memory; and
- a processor coupled to the memory, wherein the processor includes at least one processor core that includes
  - a parallel counter configured to:
    - store a first portion of a first data set in a first register;
    - store a second portion of the first data set in a second register;
    - determine a first number of values within the first register that have an identifiable characteristic, and
    - return the first number of values to an application program.

18. The computing device of claim 17, wherein the parallel counter is further configured to receive a first control signal from the application program that indicates that individual register counts should be returned to the application program.

19. The computing device of claim 17, wherein the parallel counter is further configured to:
- combine the first number of values with a second number of values within the second register that have the identifiable characteristic; and
- return the first number of values and the second number of values to an application program as a combined result.

20. The computing device of claim 17, wherein the parallel counter is further configured to receive a second control signal from an application program that indicates that a register count should be returned to the application program.

* * * * *